US007013388B2

(12) United States Patent
Fisk et al.

(10) Patent No.: US 7,013,388 B2
(45) Date of Patent: Mar. 14, 2006

(54) VAULT CONTROLLER CONTEXT MANAGER AND METHODS OF OPERATION FOR SECURELY MAINTAINING STATE INFORMATION BETWEEN SUCCESSIVE BROWSER CONNECTIONS IN AN ELECTRONIC BUSINESS SYSTEM

(75) Inventors: Mark Fisk, Montgomery County, MD (US); Robert Carroll, Westchester County, NY (US); Hirosi Maruyama, Tokyo (JP); Hatem Ghafir, Montgomery County, MD (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 10/771,107

(22) Filed: Feb. 3, 2004

(65) Prior Publication Data

US 2004/0193885 A1 Sep. 30, 2004

Related U.S. Application Data

(63) Continuation of application No. 09/343,231, filed on Jun. 30, 1999, now abandoned.

(51) Int. Cl.
H04L 9/00 (2006.01)
H04K 1/00 (2006.01)

(52) U.S. Cl. ............ 713/153; 713/152; 713/157; 713/193; 380/270; 705/54; 705/57

(58) Field of Classification Search ............ 713/153, 713/157, 152, 193, 200; 380/270; 705/54, 705/57
See application file for complete search history.

(56) References Cited

U.S. PATENT DOCUMENTS

| 4,771,459 A | * | 9/1988 | Jansen ............ 380/277 |
| 4,868,877 A | * | 9/1989 | Fischer ........... 713/157 |
| 4,914,176 A | | 4/1990 | Wang ............. 528/220 |
| 5,005,200 A | * | 4/1991 | Fischer ........... 380/30 |
| 5,218,637 A | | 6/1993 | Angebaud et al. ... 380/23 |
| 5,263,165 A | * | 11/1993 | Janis ............. 711/163 |
| 5,481,610 A | * | 1/1996 | Doiron et al. ...... 380/270 |
| 5,530,758 A | | 6/1996 | Marino ........... 380/40 |
| 5,629,980 A | * | 5/1997 | Stefik et al. ....... 705/54 |
| 5,640,501 A | | 6/1997 | Turpin ............ 395/768 |
| 5,729,594 A | * | 3/1998 | Klingman ......... 379/93.12 |
| 5,742,643 A | * | 4/1998 | Reeves et al. ...... 375/243 |
| 5,745,574 A | | 4/1998 | Muftic ............ 380/23 |
| 5,790,677 A | * | 8/1998 | Fox et al. ......... 705/78 |
| 5,799,285 A | | 8/1998 | Klingman ......... 705/26 |
| 5,850,442 A | * | 12/1998 | Muftic ............ 705/65 |
| 6,438,690 B1 | * | 8/2002 | Patel et al. ........ 713/156 |

\* cited by examiner

Primary Examiner—Kambiz Zand

(57) ABSTRACT

Techniques for use in establishing a secure exchange of information between an end user and a server in a distributed network environment are provided in accordance with a context manager. The context manager is manageable within a vault process and maintains state information between successive user browser sessions with multiple application domains containing various applications. The context manager accesses data stored on a global level that spans applications and is available to multiple vault applications in different domains. The context manager also accesses data stored on an application level and common to a given application domain for a given sequence of operations within the vault application. The context manager accesses data stored on an instance level for a given sequence of operations within a given application domain. Finally, the context manager opens the global level data, application level data, and instance level data for non-null values where a scoping level is not identified when performing a retrieval operation.

21 Claims, 4 Drawing Sheets

HTTPS://Registry.IBM.Com/Application Domain/Instance/Application Function

VAULT CONTROLLER CONTEXT MANAGER AND METHODS OF OPERATION FOR SECURELY MAINTAINING STATE INFORMATION BETWEEN SUCCESSIVE BROWSER CONNECTIONS IN AN ELECTRONIC BUSINESS SYSTEM

CROSS-REFERENCE TO RELATED APPLICATION

This application is a continuation of the pending U.S. application identified by Ser. No. 09/343,231, now abandoned filed Jun. 30, 1999, the disclosure of which is incorporated by reference herein.

This application is also related to non-provisional application Ser. No. 08/980,022 entitled "Enhanced Web Server Process & Security By Enabling Operating System Integration," filed Nov. 26, 1997, (SE9-92-005/1963-7131-US 1) assigned to the same assignee as that of the present invention and fully incorporated herein by reference.

This application is further related to the following co-pending applications, all assigned to the same assignee as that of the present invention and fully incorporated herein by reference:

1. Ser. No. 09/223,766 entitled "Secure Server Using Public Key Registration And Methods Of Operation," filed Dec. 31, 1998 (SE9-98-003/1963-7246).
2. Ser. No. 09/223,764, entitled "A Secure Communication System And Method Of Operation For Conducting Electronic Commerce Using Remote Vault Agents Interacting With A Vault Controller," filed Dec. 31, 1998 (SE9-98021/1963-7260).
3. Ser. No. 09/223,834, entitled "Vault Controller Based Registration Application Serving Web Based Registration Authorities and End Users for Conducting Electronic Commerce In A Secure End-to-End Distributed Information System," filed Dec. 31, 1998 (SE9-98-2/1963-7261).
4. Ser. No. 09/223,765, entitled "Vault Controller Supervisor And Method Of Operation For Managing Multiple Independent Vault Processes & Browser Sessions For Users In An Electronic Business System," Filed Dec. 31, 1998 (SE-98-017/1963-7256).
5. Ser. No. 09/343,231, entitled "Vault Controller Secure Depositor For Secure Communication," filed Jun. 30, 1999 (SE9-98-019/1963-7259).
6. Ser. No. 09/343,403, entitled "Vault Controller Dispatcher And Methods of Operation For Handling Interaction Between Browser Sessions & Vault Processes In Electronic Business Systems," filed Jun. 30, 1999 (SE9-98-01811963-7257).

BACKGROUND OF THE INVENTION

1. Field of the Invention

This invention relates to a secure end-to-end communication system and methods of operation using vault technology for conducting electronic business. More particularly, the invention relates to a vault controller context manager and methods of operation for securely maintaining state information between successive browser connections in an electronic business system.

2. Background Discussion

Traditionally, organizations such as retailers, banks, and insurance companies, in conducting electronic business, register their customers or users and control their access to business software applications with a user identification ("user ID") and password. The user ID and password establish a user's identity for accessing secured information. The password is the "virtual key" that authenticates a user. However, a password does not provide the security needed for electronic business. Passwords have the following limitations:

(a) can be compromised during log-on by on-lookers;
(b) can be easily intercepted on the Internet if the transaction is not secured with a secure web protocol, such as secure sockets layer;
(c) authenticate a user to a host; but not a host to a user;
(d) can be discovered using automated "trial and error" techniques;
(e) do not protect transmitted information; and
(f) do not ensure that access is limited to authorized entities and applications.

A new approach to conducting electronic business on the Internet is described in the cross-referenced application. In this approach, digital keys replaced user identification-password pairs. Public key cryptography uses mathematically related public-private key pairs. Only the private key can decrypt the information the public key has encrypted. Only the public key can verify signature performed by the private key. The public key can be made available to any one. The private key is kept secret by the holder.

Just as digital keys are replacing user identification-password pairs in electronic business, digital signatures are replacing physical signatures. A digital signature is a coded message affixed to a document or data that helps guarantee the identity of the sender, thereby providing a greater level of security than a physical signature. A digital signature identifies the sender because only the sender's private key can create the signature. The key also helps ensure the content of the signed message cannot be altered without the recipient being able to discover that the message has been altered.

Digital certificates are also replacing their physical counterpart—hard copy credentials—in electronic business. A digital certificate, issued by a certification authority, vouches for (or certifies) the key of an individual, software application, organization or business. The certificate performs a role similar to that of a drivers license or medical diploma—the certificate certifies that the bearer of the corresponding private key is authorized (by an organization) to conduct certain activities with that organization.

However, the life cycle of digital certificates is similar to that of physical certificates. Digital certificates are issued for a specific amount of time. The certificate may be temporarily suspended under certain conditions and reissued at a later time. The certificate may be permanently revoked by the organization. Finally, digital certificates expire. For secure end-to-end communication in electronic business, the certificate must be validated to determine whether the certificate has expired, been revoked or suspended.

Digital certificates are issued through authorized registrars known as Registration Authorities (RAs). The authorities determine whether the applicant should be authorized to access secure applications or services and set in motion the processes to issue a certificate. A Certification Authority (CA) issues the digital certificate after approval by the Registration Authority. The certificate is a binding between a public key and an identity, e.g., a person, organization or computer device. The certitude includes a subject name; issuer name; public key; validity period; unique serial number; CA digital signature. The CA guarantees the authenticity of the certificate through its digital signature. The certificate may be revoked at any time. The serial numbers of revoked certificates are added to a Certification Revoked List ("CRL") published in an X.500 Directory based on a standard defined by the International Telecommunications Union ("ITU"). The X.500 standard is now being used to implement a "white pages" for the Internet service. That is, a directory of people, computers, services, and of course electronic mail addresses. This on-line directory provides a single, global source of information that is constantly updated.

IBM "Vault" technology, described in the related application Ser. No. 08/980,022, supra provides strong authentication of clients and servers using digital keys and digital certificates for conducting electronic business. "Vault" technology is described in the above cross-related application. Briefly stated, "Vault" technology provides a secure environment in a web server using a vault controller (hereinafter, web server-vault controller) for running a secure web-based registration process and enabling secure application. The controller provides security from other processes running on the same server and secure areas or personal storage vaults to which only the owner has a key. System operators, administrators, certificate authorities, registration authorities and others cannot get to stored information or secure processes in such personal vaults. Combined with a Secure Sockets Layer (SSL), the controller enables secure registration transactions that require multiple sessions using personal vaults. SSL, an IETF standard communication protocol, has built-in security services that are as transparent as possible to the end user and provides a digitally secure communication channel. The personal vault is owned by a particular platform Identification (III), e.g. a UNIX ID account that is linked to a user with a specific vault access certificate. The content of the vault is encrypted and contains an encryption key pair and signing key pair, both of, which is password protected. Each vault has a unique distinguished name in an X.500 directory that provides storage for specific items essential to a Public Key Infrastructure (PKI) using digital certificates, certificate authorities, registration authorities, certificate management services, and distributed directory services used to verify the identity and authority of each party involved in any transaction over the internet. The common name portion of a distinguished name is based on a unique vault ID. In addition the controller provides a unique map between the vault ID (which identifies the UNIX user account and the user's home directory) and the vault access certificate which enables a user to access a vault process.

As a part of a secure end-to-end communication system in conducting electronic business, a need exists in a vault controller to support creation, storage and retrieval of data for state maintenance of vault processes in successive browser connections as well as across multiple units or work and even across separate applications as desired.

SUMMARY OF INVENTION

An object of the invention is a vault controller running vault processes including a context manager for maintaining state information and sharing data among multiple user browser sessions within a vault process.

Another object is a context manager supporting secure creation, storage and retrieval of data in a vault process.

Another object is a context manager using multiple levels of "scoping" in a vault process for storage and retrieval of data.

Another object is a context manager for storing and retrieving data in an instance scope where data is stored in-between interactions of a browser and a vault process.

Another object is a context manager for storing and retrieving data in an application scope common to an application domain and used across multiple instances.

Another object is a context manager for storing and retrieval data in a global scope spanning all applications and instances.

Another object is a context manager where the context presented is determined by the URL being requested by the browser.

Another object is a context manager supporting multiple concurrent requests across multiple application domains within a single vault process.

Another object is a context manager application program interface for use by multiple threads in servicing application functions in an application domain.

These and other objects, features and advantages are achieved in an electronic business system using a secure vault and running a vault process for executing user requests in multiple browser sessions with various application domains containing various application functions executable by the vault process. A context manager supports creation, storage and retrieval of data to implement "state" maintenance in the vault process using "scoping" of multiple levels of storage. In one embodiment, three levels of "scoping" are currently supported. A "local scope," also known as an "instance context" is established for a given sequence of operations within an application where data must be stored in-between interactions of a browser and a vault process. The "instance context" is only valid within a given application domain. Common Gateway Interface variables (CGI is a simple protocol that can be used to communicate between Web forms and a program.) are stored within the "local scope" for each request, allowing server side programs access to the data when retrieved from this scope. After execution of the application thread for a given instance, the "instance context" is stored (if specified by the user, otherwise deleted) on disk outside the vault process and encrypted. An "application scope" defines variables that are common to a given application domain in which variables are used across multiple instances. On vault process shutdown, the application context is stored on disk outside the vault process and encrypted. A "global scope" spans all application instances and is stored on disk outside the vault process and encrypted in the absence of user requests on vault process normal shutdown A user request is initiated by invoking a URL of the form "protocol://servername/My Application Domain/My Instance/Application Function" (protocol is https for security within Vault Controller, server name corresponds to Vault Controller machine name). The URL request is processed by a Vault Supervisor thereby obtaining a user ID and password derived from the presented certificate and initiates a vault process running in a secure vault for the user. On vault process start up, access to the vault encryption/decryption keys are made available to the request. The global context file stored on disk is decrypted and read in to memory. If the global context file does not exist, a new global context file is created on disk. For each application domain, the application context is decrypted and read in to memory. If an application context file does not exist, a new application context file on disk is created based on the request. All instance context files are scanned to determine if they have expired. If they have expired, they are deleted from disk. At this point, the vault process is in a steady state ready to process a user request. A dispatcher running in the vault responds to the user request which is in the form of a URL including user request CGI variables. Thereafter, the dispatcher parses the URL and determines the application domain as well as the instance context. If no previous instance context exists, the dispatcher generates a new random value for the new instance context. If the instance context does exist, the vault process will attempt to load the "local variable pool" from memory or from disk. All user request variables, i.e. CGI and post-data are stored in the local variable pool for the given instance context and application domain. Any previous values are overwritten so that any CGI or post-data needed across different user requests should be stored in specific user variables. The dispatcher finds an idle vault process thread to service the request. The thread will be instantiated with the application domain and the instance context. The context manager will process the thread and import the application function from disk. The local instance will be imported from disk after decryption and loaded into the application processing thread running in the vault process. After processing the request, a return code is generated by the application indicating whether the local instance should be retained. A "0" return code indicates the application has no further need for this instance and, the instance context is deleted from memory (and from disk if it was a pre-existing instance context). A non-zero code indicates that the application needs to save the instance context for later use. The instance is encrypted and stored on the instance disk for the given instance context and is retained for further use. When stored, the instance context is given a set lifetime. This set lifetime is a configurable value but global for all vaults on the controller. After processing of the user requests, vault process loops for a defined interval waiting for a subsequent user request. If request is not received with the defined interval, the vault process shuts down. The application domain and global contexts are encrypted and written to disk on shutdown. A subsequent request after shut down restarts the vault process.

DESCRIPTION OF DRAWING

The invention will be further understood from the following detailed description of a preferred embodiment, taken in conjunction with the appended drawing, in which.

DESCRIPTION OF PREFERRED EMBODIMENT

Figure 1:
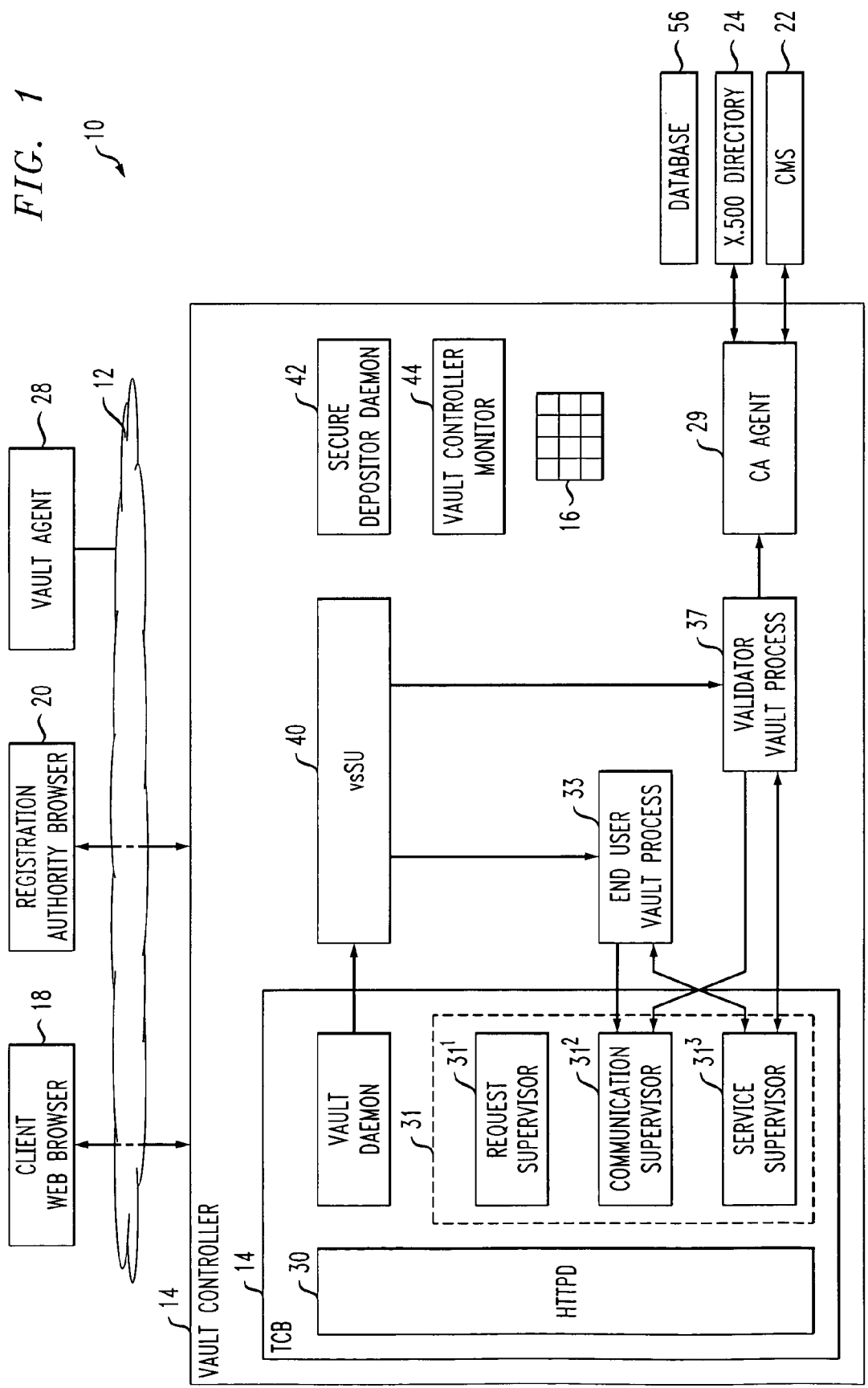
FIG. 1 is a representation of a vault controller in a secure end-to-end communication system interacting with users, vault agents, and registration authorities and incorporating the principles of the present invention.

In FIG. 1, a secure-end-to-end communication system 10 for conducting electronic business in a distributed information system 12, e.g., the Internet, includes an enhanced web server-vault controller 14 which provides processes and storage in personal vaults 16 for users 18, Registration Authorities (RAs), certificate management system 22, database 56, and an X.500 directory 24. An external vault agent 28 is an optional lightweight vault process designed to run remotely at a customer's location. The agent incorporates a small subset of the vault process functionality. The subset enables the agent to exchange secure messages with vault processes running under the control of the vault controller. Further details of the vault agent are described in copending application Ser. No. 09/223,764, filed Dec. 31, 1998 (SE9-98-021/1963-7260), supra.

The personal vaults 16 in the controller provide a secure environment for executing programs and applications on behalf of the designated user. Personal vaults and their contents are accessible from SSL-enabled web browsers operated by the user 18. In one form, a personal vault is a directory in a storage area, e.g. a disk drive. Access to personal vaults does not require knowledge of a vault password and keys. Access to personal vaults requires a vault access certificate and a private key. Information stored in personal vaults is protected against disclosure to unauthorized persons (such as System Administrators and other vault owners) by encryption; against tampering by digital signature; and against untrusted communications with unknown parties by authentication using digital certificates. Information can also be transmitted securely to other local vaults within the controller and with external or remote vaults through a secure depositor (not shown) included in each vault. The secure depositor is described in (SE9-98-019/1963-7259), supra.

In conducting electronic business, the registration authority 20 reviews each user registration request that is submitted; validates the request, and then approves or rejects the request. The registration decision is provided to a certification agent 29, which uses the certificate management system 22 to issue, suspend, resume, renew or revoke X.509v3 certificates to users whose registration requests are approved. Additionally, the certification authority publishes certificates, Certificate Revocation Lists (CRL), and policy information of organizations relative to electronic business in an X.500 directory 24. The X.509v3 certificates, CRL's, CA policies and other information about registered users and servers is stored in the X.500 Directory. An authorized user or software application can find a public key certificate for a particular person or server by searching the Directory for that person's or server's unique distinguishing name or other relevant information. The Distinguished Name (DN) is a unique name of a data entry stored in the X.500 Directory. The DN uniquely identifies the position of an entry in the hierarchical structure of the Directory. Further details of the Registration and Certification Authorities are described in Ser. No. 09/223,834, filed Dec. 31, 1998 (SE9-98-022/1963-7261), supra.

Continuing in FIG. 1, the vault controller provides secure end-to-end communication using browser client authentication and SSL protocol. The browser request is encrypted and sent to the vault controller along with a vault access certificate. The controller consists of three major components. :A web server 30, e.g., Lotus Domino Go web server; a vault process supervisor 31; and vault processes 33, 37. The Lotus Domino Go web server is a secure scalable, high performance, transaction-ready web server that allows a web browser to interface with vault controller; allows a web browser to communicate securely with vault controller software via the SSL protocol; and authenticates a user's digital certificate and key. The vault controller further comprises a vsSU 40, a program that runs with UNIX root privileges to launch processes which run under various user ID's, as well as a secure depositor daemon 42 and a vault controller monitor 44.

The vault process supervisor 31, comprising request supervisor $31^1$, communication supervisor $31^2$, and service supervisor $31^3$, validates and maps a vault access certificate to a user ID and password. In a first step a vault process is then launched on behalf of that user to handle the user's request. In a second step, the vault process supervisor maintains a state table for determining whether a vault process is already running on behalf of the user. If a vault process is already running, the supervisor will attach the user to the existing vault process. In a third step, the vault process responds to the user request. The vault process shuts down after a predetermined period of inactivity, but until that period is reached, the process may be automatically activated when a user request is received. Further details of the vault process supervisor are described in Ser. No. 09/343,403, filed Jun. 30, 1999 (SE9-98-017/1963-7256), supra.

Each vault process is multithreaded and able to handle multiple, simultaneous requests from the user. Additionally, each thread has its own local storage area allowing it to maintain "state" across multiple browser-server interactions.

Entries in the X.500 Directory and the certificates in the vault enable users to encrypt and sign data for any other user on the system that has a vault. The information is safely encrypted using a public key of the recipient.

Figure 2:
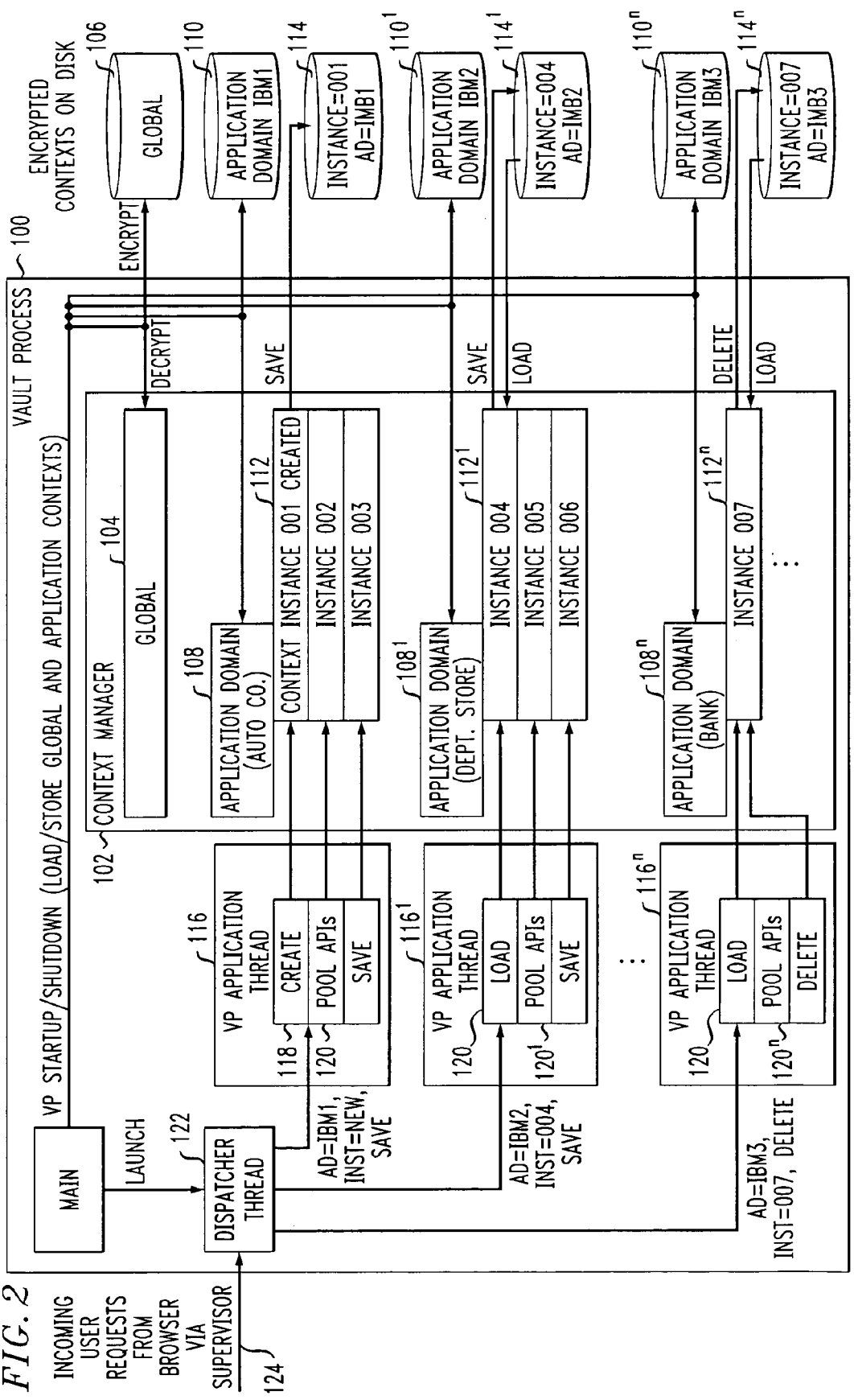
FIG. 2 is a representation of a context manager in the vault controller or FIG. 1.

In FIG. 2, a vault process 100 is configured in a vault assigned to the user after certification by a Certification Authority (CA) (See FIG. 1). A vault process is a program that runs in behalf of a user in a dedicated vault assigned to the user. The vault process is multithreaded and able to handle multiple simultaneous requests from a user. Further details of a vault process are described in Ser. No. 08/980,022 filed Dec. 31, 1998 (SE9-98-017/1963-7256). Embedded in the vault process is a context manager 102 to support the creation, storage, retrieval of data and maintain the "state" of a user request in a "stateless" web-based access environment. In the prior art, applications designed to have multiple interactions with a user are forced to deploy their own techniques to save "state" to be used from one user interaction to the next. In the present invention, the context manager provides services that maintain "state" across many servers to browser interaction.

In addition to preserving state, the context manager stores application information at three levels: (a) a global level such that any application running in the vault can access the global information—global information is similar to global variables in a program which spans all applications and application contexts; (b) an application domain level which includes application functions with variables that are common across the application domain but are used in different instances or work operation, and (c) an instance context for a given sequence of operations within an application where data must be stored in between interaction of the browser and the vault process. An example of an instant context variable would be a client IP address of a requestor or data posted from the browser containing form data from a user to be stored for the vault process.

The context manager includes a data structure for storing the global context in memory of global application 104 as well as a mechanism for importing and exporting global context to external storage 106. The encryption/decryption keys are the same ones made available when the vault process is activated by the supervisor 31. The context manage 102 further includes a data structure for storing the application domain 108 as well as a mechanism for importing and exporting an application context to external storage 110, $110^1$, $110^n$. The context manager supports multiple application domains $108^1$ and $108^n$, where each application context corresponds to a different application domain and corresponding set of functions. For example, application domain 108 may relate to an auto company which has a series of application running under the domain related to the buying, selling, leasing of new and used cars, etc. Application domain $108^1$ relates to a department store which has a series of applications running under the domain related to the buying and selling of clothing, furniture, appliances, etc. Application domain $108^n$ relates to a bank which has series of applications running under the domain related to checking accounts, savings accounts, loans, mortgages, etc. As a part of servicing a user request, an instance context structure 112, $112^1$, $112^n$ is created and populated in memory (and always corresponds to a specific application domain). Again, a mechanism is supported for importing and exporting the instance context to external storage 114. Multiple instances may be created by the context manager under each application domain.

A context is made up of variables and their values. The variables exist at any of three levels. Global variables are variables available to all applications running as threads in a given vault (for example, a vault owner's name, address, telephone number, etc.). Application variables are accessible only to threads specific to a given application domain. Instance context variables are accessible only to a specific instance of an application that defines them. The variables to be saved as application "state" are kept, under program control as pool variables associated with the previously mentioned context identifier.

Figures 3, 4:
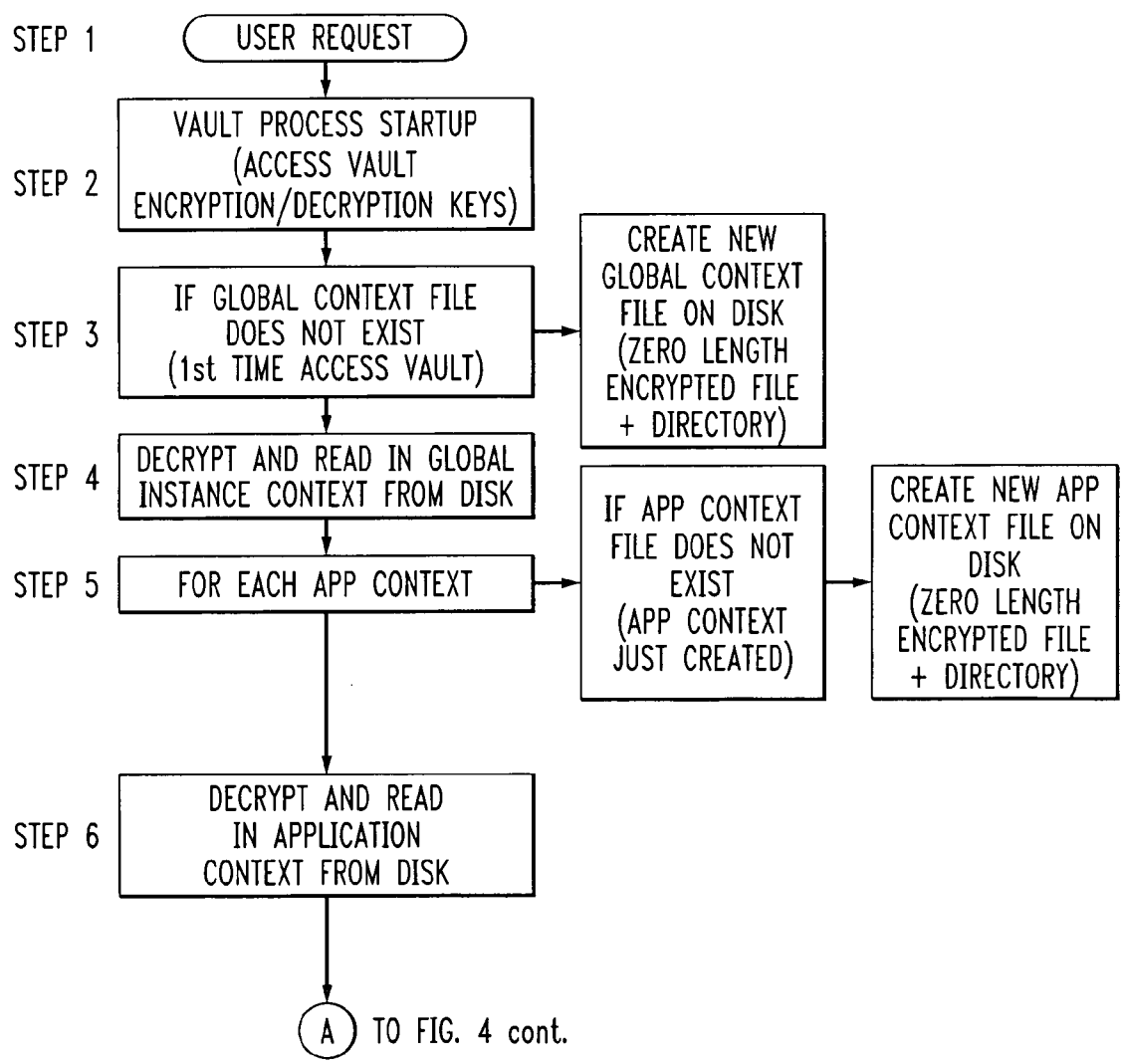
FIG. 3 is a representation of a Uniform Resource Locator (URL) used in the operation of the context manager of FIG. 2.
FIG. 4 is a flow diagram of the operation of the context manager in FIG. 2.
Figure 4:
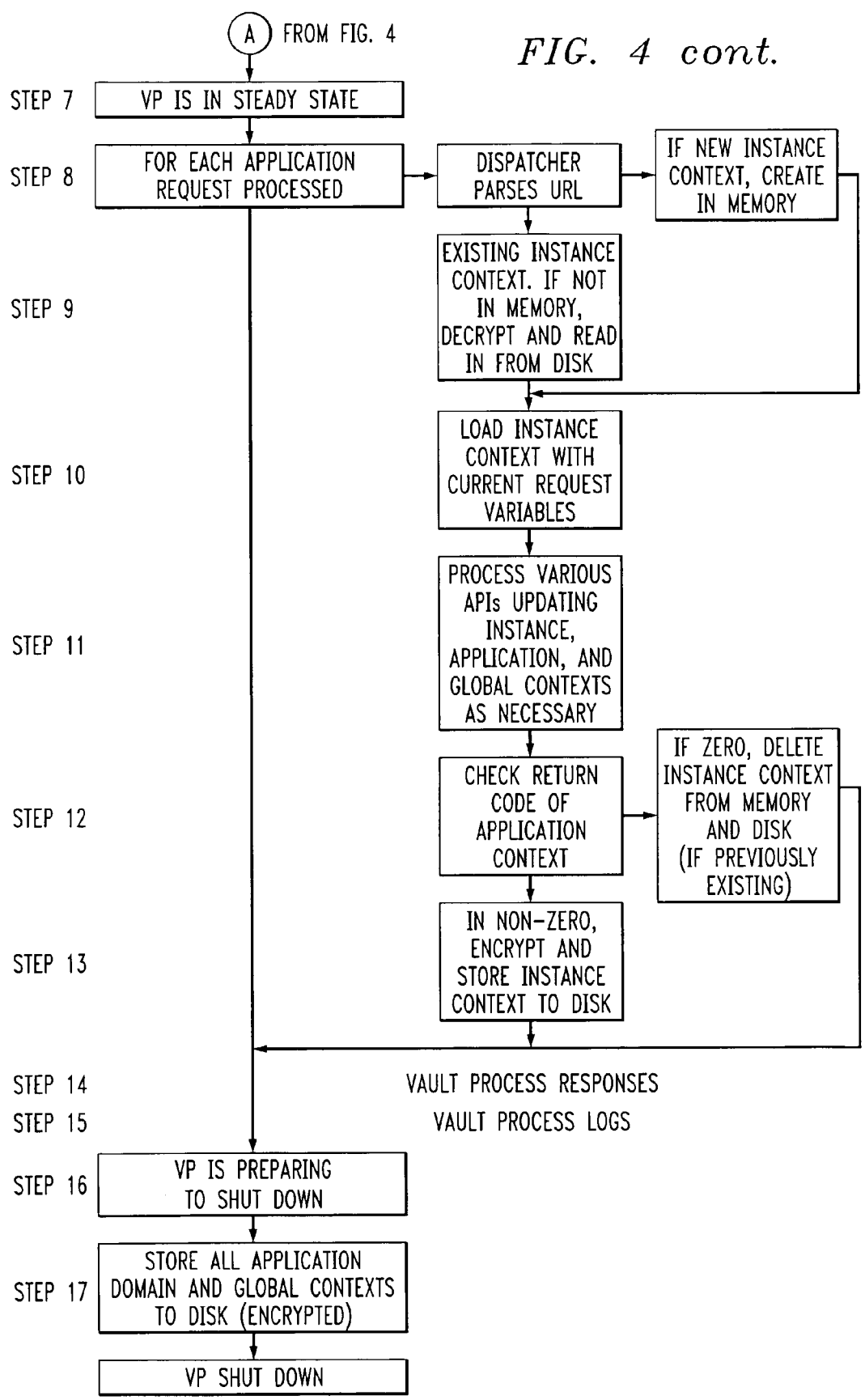

A user request is contained in a URL shown in FIG. 3. The URL includes the (a) designation of the application domain; (b) instance context, and (c) application function to be executed. When a user clicks a URL to continue processing the next phase of the same application, the context identifier is extracted from the URL that is presented and is used as an index to the appropriate pool variables stored under that instance context. The application domain is also extracted from the URL and used as an index into the application context's pool variables. The global context is always accessible, so therefore the global pool variables are as well. The continuity of pool variables is preserved in communicating with the browser by including a context ID and Application Domain in all embedded URLs written back to the browser. The initial function and subsequent continuation functions together implement a specific task that requires multiple interactions with the end user for completion. If the application has no further need, the instance context is deleted from memory. A non-zero code indicates that the application needs to save the instance context for later use. The local variable pool is encrypted and stored on the instance disk for the given instance context and is retained for further use. When stored, the instance context is given a set lifetime. This set lifetime is a configurable value but global for all vaults on the controller. After processing of the user requests, vault process shutdown occurs. The application domain and global context are encrypted and written to disk and a response returned to the user, as appropriate. If no request is received in a defined interval, the vault process shuts down to await another request The user application uses the functions of "pool get"; "remove pool variable"; and "store pool variable" to interact with the context manager. The "pool get" variable retrieves pool variables from the pool. The search is performed first on the local level, next on the application level and last on the global level. The "remove pool variable" resets or clears pools variables. The function can be used only to remove user variables set by application using a store application program interface. Once a pool variable has been removed from a specified level it is no longer available to any applications running in the users vault. The "store pool variable" stores variables set by application using the store API. A pool variable that has been stored is available to any application running in the user vault with the following constraints. Global variables are available to all applications. Application variables are available to applications with the same application domain. Local context variables are available to applications with the same instance context providing the instance context was saved by the current application.

The context manager is responsive to vault process application threads 116, 116' and 116" serving application domains 108, 108' and 108", respectively. Each application thread has the ability to call the "pool" APIs as well as many other Vault Controller APIs while it is processing. The threads 116, use the pool variable functions "to get", "store" and "remove or delete" pool variables. Each thread 116 is under the control of a dispatcher 122 responsive to an incoming user request 124 from the browser via the supervisor and expressed in URL format.

Where the instance context (b) is zero in the URL shown in FIG. 3, the dispatcher generates a new random value for the new instance context. The context is unique across all application domains for the personal vault. If the instance context is non-zero then the dispatcher assumes the instance context was created in a previous session. The dispatcher will then find an idle thread 116 to service the user request. The thread will be instantiated with the application domain and the instance context from the URL. In the case of the instance context being zero, the context manager will create an instance context from the URL. The instance context includes posted information e.g., a form or the like; browser identification; protocol, etc. the totality of the information being referred to as CGI variables in the browser request. CGI stands for Common Gateway Interface. It's a simple protocol that can be used to communicate between Web forms and a program. A CGI script can be written in any language that can read MIN, write to STDOUT, and read environment variables, i.e. virtually any programming language, including C, Perl, or even shell scripting. Variables that can be read by a program include all user input in a Web form. There are two types of request types when a form is submitted on the web; the first is POST, and the other is GET. A program can get the request type by reading a CGI variable called "REQUEST_TYPE". If the REQUEST_TYPE is POST then the program can read the form input by reading Standard In (STDIN), just like it would read input from a keyboard. If the REQUEST_TYPE is GET, then the program can read the form input by reading another CGI Variable called "QUERY STRING." Other useful CGI variables are BROWSER TYPE (since the program may send different output based on the browser type), SERVER NAME, etc.

The CGI variables and browser request information are loaded into the instance context for processing in the application for the selected application domain. Details of the dispatcher are described in copending application (SE9-98-018/1963-7257), supra. Upon completion of the application function, the context manager has the option of saving or deleting the instance. When the instance context is saved, the context manager immediately exports the instance to external storage 114 in encrypted form. By paging the context to disk, the context is preserved in the event of catastrophic failure of the vault process. Upon completion of the instance storage, the application sends a page back to the user through the dispatcher and supervisor and incorporates in the page the context ID and Application Domain for subsequent URL links. When stored, the instance context is given a lifetime, typically a week. The lifetime is a configurable value and global for all vaults and global for all vaults on the vault controller.

When the user submits a new request the context ID and Application Domain will both be embedded in the page and after processing by the dispatcher, the application domain and the instance context will be instantiated in a request to the context manager. The context manager loads the instance context into the application which then proceeds to process the information as a part of the application. If a response is required for the user for which the instance context need continued use, the context manager will embed the context number in the page returned to the user. Again the context information is encrypted and paged out to the disk upon completion of the application function.

In another example, a user request containing a context instance is processed by the context manager. The application may programmatically conclude after the application function is completed that the instance is no longer required and return a "0" code to the context manager. In such case, the context manager will delete the instance from the storage level using the "remove" API pool variable. When the overall application processing is completed (normal vault process shutdown), the application and global variables are encrypted and paged to disk 110, 106, respectively. A non-zero code indicates that the instance needs to save the instance context for later use.

The operation of the context manager will be described in FIG. 4, taken in conjunction with FIGS. 1–3, as follows:

Step 1. A user request in the form of a URL message (FIG. 3) is processed by the supervisor which decodes a Vault Access Certificate (VAC) Serial number included in the request. The VAC is translated into a User ID and password Step 2. The supervisor provides the ID and password to start up the vault process 100 running in a vault previously assigned to the user when the VAC was issued. The vault process uses the ID and password to obtain encryption and decryption keys from a file associated with the vault. The keys are used in the vault for exporting and importing encrypted/decrypted data to/from external storage 106, 110, 114.

Step 3. The vault start up process loads the global variable pool or global context from the external storage 106 into a global application 104 running the context manager. If the global context does not exist, the context manager creates a new global context file on external storage 106.

Step 4. The global context is decrypted using the keys provided by the vault process and imported into the global application 104.

Step 5. The variable pool for each application function is decrypted and read into the Application Domain 108 from external storage 110. If an application instance 112 does not exist for an application function, the context manager creates a new application instance context file on disk.

Step 6. Each application instance 112 is decrypted and read into the application function from external storage 114.

Step 7. At this point the vault process is in steady state and ready to process user requests.

Step 8. A user request is received by the supervisor as a URL and passed to the dispatcher 122. The dispatcher parses the URL into (a) an application domain; (b) an application function; (c) a context instance for the application function; and (d) user request variables. The Application Domain is the desired application to execute the function in response to the user request and includes the support of Registration and Certification authorities. The application function defines the scope of the pool variables for the function. The instance defines the local pool variables for the function. The user request variables include posted data and CGI variables for processing by the application function. If an instance does not exist, the context manager creates a new instance.

Step 9. The dispatcher will find an idle thread 116 to service the request. The thread will be instantiated with the application domain and application context. The existing application instance is read into the application function.

Step 10. The current request variables are loaded into the application instance.

Step 11. The various API pool variables are used to update the instance, application and global contexts as necessary service the user request.

Step 12. The application function generates a return code indicating the status of the instance. A "0" return code indicates to the context manager that the instance need not be saved.

Step 13. A "non-0" return code indicates to the context manager that the instance should be saved as a part of servicing subsequent user request.

Step 14. The context manager transmits a response to the user request and incorporates the return code in the HTML page sent to the user browse.

Step 15. The vault process loops until the next request is received whereupon Steps 8–14 are repeated, provided the request is within a defined time period after servicing of the previous request.

Step 16. The vault process shuts down upon the expiration of the defined time period.

Step 17. The global, application and instance pool variables are encrypted and exported to external storage 106, 110 and 114, respectively.

Step 18. The vault process shuts down and the next user request is serviced by Steps 1–14.

While the invention has been shown and described in connection with a preferred embodiment, various changes may be made without departing from the spirit and scope of the invention as defined in the appended claims, in which:

The invention claimed is:

1. A method for use in establishing a secure exchange of information between an end user and a server in a distributed network environment, the method comprising the steps of:
   in accordance with a context manager, manageable within a vault process, wherein the context manager maintains state information between successive user browser sessions with multiple application domains containing various applications, the context manager:
      accessing data stored on a global level that spans applications and is available to multiple vault applications in different domains;
      accessing data stored on an application level and common to a given application domain for a given sequence of operations within the vault application;
      accessing data stored on an instance level for a given sequence of operations within a given application domain; and
      opening the global level data, application level data, and instance level data for non-null values where a scoping level is not identified when performing a retrieval operation.

2. The method of claim 1 further comprising the step of: scoping the global level, application level, and instance level within the vault process.

3. The method of claim 1 further comprising the step of: generating a new global context file if a global context file does not exist in data stored on the global level.

4. The method of claim 1 further comprising the step of: creating a new application context file based on the request, if an application context file does not exist in data stored on the application level.

5. The method of claim 1 further comprising the step of: storing Common Gateway Interface (CGI) variables within the instance level of storage for each request allowing server side programs to access the data.

6. The method of claim 1 further comprising the step of: importing an instance context from data on the instance level after decryption; and
loading the instance context into an application function running in the vault process.

7. The method of claim 1, further comprising the steps of: initiating a user request by invoking a URL with an embedded application domain and instance context;
initiating a vault process running a secure vault for the user;
accessing vault encryption/decryption keys;
scanning instance level data to determine if the instance level data has expired;
determining the application domain as well as the instance context;
loading a local variable pool from memory;
selecting an idle vault process thread to service the request;
instantiating the application domain and the instance context in the thread; and
processing the thread and importing the application function from storage.

8. The method of claim 1, further comprising the step of: generating a return code indicating whether an application context should be stored on the application level and whether an instance context should be stored on the instance level for later user requests.

9. The method of claim 1, further comprising the steps of: storing global level data, application level data, and instance level data in encrypted form; and
storing active contexts on normal vault process.

10. The method of claim 1, further comprising the step of: setting a lifetime for an instance context on the instance level that is a configurable value but global for vaults.

11. Apparatus for use in establishing a secure exchange of information between an end user and a server in a distributed network environment, the apparatus comprising:
a context manager, manageable within a vault process, wherein the context manager maintains state information between successive user browser sessions with multiple application domains containing various applications, operative to: (i) access data stored on a global level that spans applications and is available to multiple vault applications in different domains; (ii) access data stored on an application level and common to a given application domain for a given sequence of operations within the vault application; and (iii) access data stored on an instance level for a given sequence of operations within a given application domain; and (iv) open the global level data, application level data, and instance level data for non-null values where a scoping level is not identified when performing a retrieval operation.

12. The apparatus of claim 11, further operative to:
initiate a user request by invoking a URL with an embedded application domain and instance context;
initiate a vault process running a secure vault for the user;
access vault encryption/decryption keys;
scan instance level data to determine if the instance level data has expired;

determine the application domain as well as the instance context;

load a local variable pool from memory;

select an idle vault process thread to service the request;

instantiate the application domain and the instance context in the thread; and process the thread and importing the application function from storage.

13. The apparatus of claim 11, further operative to:

generate a return code indicating whether an application context should be stored on the application level and whether an instance context should be stored on the instance level for later user requests.

14. The apparatus of claim 11, further operative to:

store global level data, application level data, and instance level data in encrypted form; and store active contexts on normal vault process.

15. The apparatus of claim 11, further operative to:

set a lifetime for an instance context on the instance level that is a configurable value but global for vaults.

16. The apparatus of claim 11, further operative to:

scope the global level, application level, and instance level within the vault process.

17. The apparatus of claim 11, further operative to:

generate a new global context file if a global context file does not exist in data stored on the global level.

18. The apparatus of claim 11, further operative to:

create a new application context file based on the request, if an application context file does not exist in data stored on the application level.

19. The apparatus of claim 11, further operative to:

store CGI variables within the instance level of storage for each request allowing server side programs to access the data.

20. The apparatus of claim 12, further operative:

import an instance context from data on the instance level after decryption; and load the instance context into an application function running in the vault process.

21. An article of manufacture for use in establishing a secure exchange of information between an end user and a server in a distributed network environment, comprising a machine readable medium containing one or more programs which when executed implement the steps of:

in accordance with a context manager, manageable within a vault process, wherein the context manager maintains state information between successive user browser sessions with multiple application domains containing various applications, the context manager:

accessing data stored on a global level that spans applications and is available to multiple vault applications in different domains;

accessing data stored on an application level and common to a given application domain for a given sequence of operations within the vault application;

accessing data stored on an instance level for a given sequence of operations within a given application domain; and opening the global level data, application level data, and instance level data for non-null values where a scoping level is not identified when performing a retrieval operation.

\* \* \* \* \*